(12) United States Patent
Ang

(10) Patent No.: US 10,782,966 B2
(45) Date of Patent: Sep. 22, 2020

(54) ARTIFICIALLY INTELLIGENT SELF-LEARNING SOFTWARE OPERATING PROGRAM

(71) Applicant: Elmo AI, Jersey City, NJ (US)

(72) Inventor: Christopher Ang, Jersey City, NJ (US)

(73) Assignee: Wernicke LLC, Jersey City, NJ (US)

( * ) Notice: Subject to any disclaimer, the term of this patent is extended or adjusted under 35 U.S.C. 154(b) by 139 days.

(21) Appl. No.: 16/035,582

(22) Filed: Jul. 13, 2018

(65) Prior Publication Data

US 2019/0018675 A1     Jan. 17, 2019

Related U.S. Application Data

(60) Provisional application No. 62/531,948, filed on Jul. 13, 2017.

(51) Int. Cl.

| | |
|---|---|
| *G06F 9/30* | (2018.01) |
| *G06N 5/04* | (2006.01) |
| *G06K 9/32* | (2006.01) |
| *G06F 3/0482* | (2013.01) |
| *G06F 16/903* | (2019.01) |
| *G06F 16/583* | (2019.01) |
| *G06K 9/00* | (2006.01) |
| *G06F 40/205* | (2020.01) |

(52) U.S. Cl.
CPC ........ *G06F 9/30003* (2013.01); *G06F 3/0482* (2013.01); *G06F 16/5854* (2019.01); *G06F 16/903* (2019.01); *G06F 40/205* (2020.01); *G06K 9/00449* (2013.01); *G06K 9/3233* (2013.01); *G06N 5/046* (2013.01); *G06K 2209/01* (2013.01); *G06K 2209/03* (2013.01)

(58) Field of Classification Search
CPC ............ G06F 9/30003; G06F 16/5854; G06F 16/903; G06F 40/205; G06F 3/0482; G06K 9/00449; G06K 9/3233; G06K 2209/01; G06K 2209/03; G06N 5/046
See application file for complete search history.

(56) References Cited

U.S. PATENT DOCUMENTS

| | | | | |
|---|---|---|---|---|
| 8,401,221 | B2 * | 3/2013 | Milov | G06F 11/3688 |
| | | | | 382/100 |
| 2011/0047488 | A1 * | 2/2011 | Butin | G06F 3/04842 |
| | | | | 715/762 |
| 2015/0339213 | A1 * | 11/2015 | Lee | G06F 11/3664 |
| | | | | 717/125 |
| 2017/0060368 | A1 * | 3/2017 | Kochura | G06F 9/451 |
| 2018/0210824 | A1 * | 7/2018 | Kochura | G06F 11/368 |

* cited by examiner

*Primary Examiner* — Leon Viet Q Nguyen
(74) *Attorney, Agent, or Firm* — K&L Gates LLP

(57) ABSTRACT

A method of training a computer program to recognize software application controls includes: providing a controller and a memory coupled to the controller, wherein the controller is configured to: receive a plurality of images of one or more GUIs of one or more software applications, analyze the one or more GUI images via an image recognition algorithm to identify a position and associate a function for each of one or more user input controls found in the images, generate a set of execution instructions including the identified position of the input controls and their associated functions, test the accuracy of the execution instruction by executing the identified input controls in the one or more software applications and analyze one or more images captured to show the results of the execution.

20 Claims, 8 Drawing Sheets

ARTIFICIALLY INTELLIGENT SELF-LEARNING SOFTWARE OPERATING PROGRAM

BACKGROUND

The present disclosure describes a computerized artificially intelligent self-learning software operating program. More specifically, the present disclosure describes a computerized artificially intelligent self-learning software operating system that can automatically learn to operate other software via images of the other software's graphical user interfaces.

Programming automated software controls is an enormous task, so large in fact it has resulted in the creation of a profession centered specifically on this task. Software automation engineers and similar types of computer programmers devote countless hours to programming automated controls of various types of software programs, with the code which carries out these controls being static in nature and in need of re-programming when a given software application is updated or replaced.

For example, many menial tasks such as automatically filling in data forms or clicking a button repeatedly can be automated via the use of a computer program, code, algorithm, etc. (programmed in JavaScript, C++, or another programming language). However, if the data form or graphical user interface buttons are altered by a software update or even implementation of a new type of software, the previously programmed automation controls are rendered useless until fixed or replaced by a programmer.

Computer programmers are highly skilled workers and thus the cost of their work presents high overhead and the re-programming of automated tasks also presents an unenjoyable task for such programmers. Accordingly, there is a need for an a computerized artificially intelligent self-learning software operating system that can automatically learn to operate other software via images of the other software's graphical user interfaces.

BRIEF SUMMARY OF THE INVENTION

The present disclosure describes a computerized artificially intelligent self-learning software operating program.

In one embodiment of the system, an artificially intelligent program (e.g., "bot") will be trained on how to recognize software application controls. It will then also be trained how to understand human language (in email/voice/chat/etc.) and convert those to executable steps to be able to perform certain tasks (e.g., manual tedious computer tasks).

For example: a user could email the following command to a bot (the bot is referred to herein 'Elmo'): "Elmo, please add user 'Nancy Smith' to system". The 'Elmo' bot would previously have the following computerized set of controls trained on this task: (1) Open program 'User management system.exe'; (2) Click the tab Users; (3) Enter first name and last name in textboxes; (4) Click Submit. As described further herein, the Elmo bot knows to use the instructions above for the task assigned by a system user. The bot then executes the task and sends a confirmation to the user once complete.

The system can program a given bot with these controls manually via a graphical user interface or automatically through an image intake engine/application which searches the web and downloads related images for software application controls to be used to train the bot. The software application screenshots used in the training process are referred to herein as Training Data. In one example, tens of thousands of "software application screenshot" images are fed to Elmo for the bot to learn to accurately identify the patterns of given software application controls. The system applies a mask to the Training Data using a convolutional neural network such as, for example, Faster RCNN. In another example, a fully convolutional network is used to improve the training model. A 'Software Application Control Classifier' engine allows end users to quickly identify controls in images/screenshots so that the bot "Elmo" can be trained on what IS and what is NOT a software application control, such as what is a button (1) and what is not a button (0). Accordingly, as described, the bot learns from the training data it is given using machine learning techniques and the automated learning process can be supplemented with user input through the software application control classifier.

The software components of the bot are built to enable the bot to click, focus, enter text, select checkboxes, select drop down options, and locate labels. These functions may be build, for example, in C+ and Python. The bot performs the above actions in combination with the software application controls and a classifier program based on convolutional neural networks (CNNs) to build the model. A high-level API (such as, for example, the high-level API sold under the trademark Keras by TensorFlow) may be used to assisting in building and training the models.

Using OCR and text extraction algorithms, the bot can identify text in a screenshot in the Training Data. From these techniques, the bot can locate the controls and labels in a screenshot and then, from the centroid position of these objects, the bot can match the coordinates with the coordinates of these controls and labels in the software application.

Using the Image Intake engine, the system may locate and download additional images that match criteria for the software application for which the bot is being trained. The additional images are considered Test Data. The Test Data is then used to feed the bot and the bot must respond with the coordinates of the controls (such as buttons). The accuracy of coordinates must exceed a predetermined threshold before the bot is considered viable for live operation. For example, when the software application control detection meets or exceeds 90% accuracy in locating controls in a software application image, the bot may be considered viable and put into live use. The measure of accuracy confirms that the bot is smart enough to detect the types of buttons and controls that it will be required to identify in use.

In a further example, the bot uses Natural Language Processing (NLP) algorithms to parse user instructions. The bot may be taught how to interpret human commands (text (string)/chat/email) and convert those user instruction sets into executable instructions, such as clicking, selecting, text input, etc.

An example of executable instructions may be "Enter First Name"=>"Textbox Input" (90-97% probability) "Parameters: First Name". At run-time, the bot looks to identify the appropriate control through which to enter the first name. For example, the bot may identify the control based on what has been learned from prior examination of related screen shots or else it will try to locate the control based on label/text extraction and algorithms to find the control for "First Name." The words "First Name" immediately adjacent to a textbox input indicate a high probability for that input to be the correct control.

The system may include an interface to allow instruction sets to be uploaded into the bot. These instruction sets are user defined (customer defined) so that the bot is flexible and can work with almost any software application. Example: "How to Add User to QuickBooks"—may include steps 1-5, such as: step 1—Click Add User Button; step 2—Enter First Name; etc. The bot processes instruction set(s) and compiles the instructions into a workflow.

The system may also include a testing area to preview, test, and validate a given instruction set and workflow. This testing area allows user to input test commands to validate the instruction sets, such as "Elmo, add Nancy Smith to system as Administrator." The bot will then, using any parameters provided by user (such as first name=Nancy Last Name=Smith Role=Administrator) execute on what it learned from steps 1-5.

The system may also include a configuration area to define at least one 'Manager' for whom the bot will listen for instructions. The bot will not take commands from anyone except a pre-authorized "manager" user. The bot may also include settings for "Personality" such as "Cautiousness" (e.g., whether the bot requires confirmation prompts, greater or fewer prompts, etc.). Additionally, the system may be configured so the bot can take instructions over emails and respond to manager(s) in addition to voice commands, traditional mouse/keyboard inputs, haptic inputs, etc.

The system may build logic around connecting controls with instruction sets, adapters and helper classes, background thread services for a bot to run. In this example, the bot can handle human voice/text/email/chat commands to operate one or more software applications. Such as "Elmo, please create invoice for 'Dorothy Lang' for product with code ULE-1029 and email it to me." The system will confirm receipt of command (if configured to do so) and then email confirmation once the task is completed. The workflow may include providing the requestor with a screenshot of last screen in the process, as well as a copy of the invoice that had been requested.

In one example, a method of training a computer program to recognize software application controls includes: providing a controller and a memory coupled to the controller, wherein the memory is configured to store program instructions executable by the controller, wherein in response to executing the program instructions, the controller is configured to: receive a plurality of images of one or more GUIs of one or more software applications, analyze the one or more GUI images via an image recognition algorithm to identify a position and associate a function for each of one or more user input controls found in the images, generate a set of execution instructions including the identified position of the input controls and their associated functions, test the accuracy of the execution instruction by executing the identified input controls in the one or more software applications and analyze one or more images captured to show the results of the execution, wherein, when the tested accuracy exceeds a threshold accuracy for the location of controls and associated functions, the execution instruction is identified as live.

The one or more GUI images may be further analyzed by a text extraction program to identify a position and associate a function for each of one or more user input controls found in the images. The text extraction program may utilize optical character recognition. The identified position of an input control may be a centroid position of the input control. The execution instructions may be instructions to click a button, input text, select checkboxes, selects drop down options within an application, etc. or any combination thereof.

In some examples, when an end user performs a keyword search, the program instructions generate an execution instruction corresponding, at least in part, to one or more terms of the keyword search.

The program instructions may further include instructions that, when executed, dictate the amount of manual review required before the execution instructions are executed.

In another example, a method of training a computer program to recognize software application controls includes: providing a controller and a memory coupled to the controller, wherein the memory is configured to store program instructions executable by the controller, wherein in response to executing the program instructions, the controller is configured to: receive a plurality of images of one or more GUIs of one or more software applications; analyze the one or more GUI images via an image recognition algorithm to identify a position and associate a function for each of one or more user input controls found in the images; generate a set of execution instructions including the identified position of the input controls and their associated functions; and execute the execution instructions in response to receiving one or more voice commands or one or more text commands from a user.

The one or more GUI images may be further analyzed by a text extraction program using optical character recognition to identify a position and associate a function for each of one or more user input controls found in the images. The identified position of an input control may be a centroid position of the input control. When executed, one of the execution instructions may click a button, input text, select a checkbox, or select a drop-down option within an application. The one or more voice commands or one or more text commands from a user may be received as part of an end user keyword search. The program instructions may further include instructions that, when executed, dictate the amount of manual review required before the execution instructions are executed.

A goal of the present invention is to alleviate the need for programmers to code and test automated software controls. Many programmers enjoy creating software applications and updating them, however few enjoy the tedium of writing code and programs to act as a go between two pieces of software. The presently disclosed systems and methods enable an end user to enjoy automated control of various software programs without the need to manually program such controls.

An advantage of the present invention is that is presents a large cost savings to companies looking to automate various tasks. For example, updating software of an industrial machine controlled by a separate software suite typically requires the machine's control software to be updated as well as the programming or algorithm for any automated controls rendered ineffective by the update to be re-programmed as well. The present invention enables any updates to the machine's control software to be automatically detected, assessed, and for a new automated control to be introduced without the need for human intervention (or intervention at only the highest levels). This automated process could potentially save enormous sums of money and eliminate or minimize the need for costly skilled workers (e.g., software automation engineers).

Another advantage of the present invention is it enables end users to utilize any computer program, no matter their level of skill. Many people, regardless of education level, struggle with computer use. Particularly for software which is not intuitive and/or complicated, many end users have to spend countless hours searching help guides and the internet to determine how to complete tasks of which they are unknowledgeable. Once more, the steps to perform many of these complicated tasks are easily forgotten, meaning the end users have to re-research a task when they wish to complete it again. The presently described invention prevents this issue by enabling end users to instruct an artificially intelligent computer system to carry out a task in plain English, with the AI system ascertaining the steps needed without the need for hours of manual research.

Additional objects, advantages and novel features of the examples will be set forth in part in the description which follows, and in part will become apparent to those skilled in the art upon examination of the following description and the accompanying drawings or may be learned by production or operation of the examples. The objects and advantages of the concepts may be realized and attained by means of the methodologies, instrumentalities and combinations particularly pointed out in the appended claims.

BRIEF DESCRIPTION OF THE DRAWINGS

The drawing figures depict one or more implementations in accord with the present concepts, by way of example only, not by way of limitations. In the figures, like reference numerals refer to the same or similar elements.

DETAILED DESCRIPTION

Figure 1:
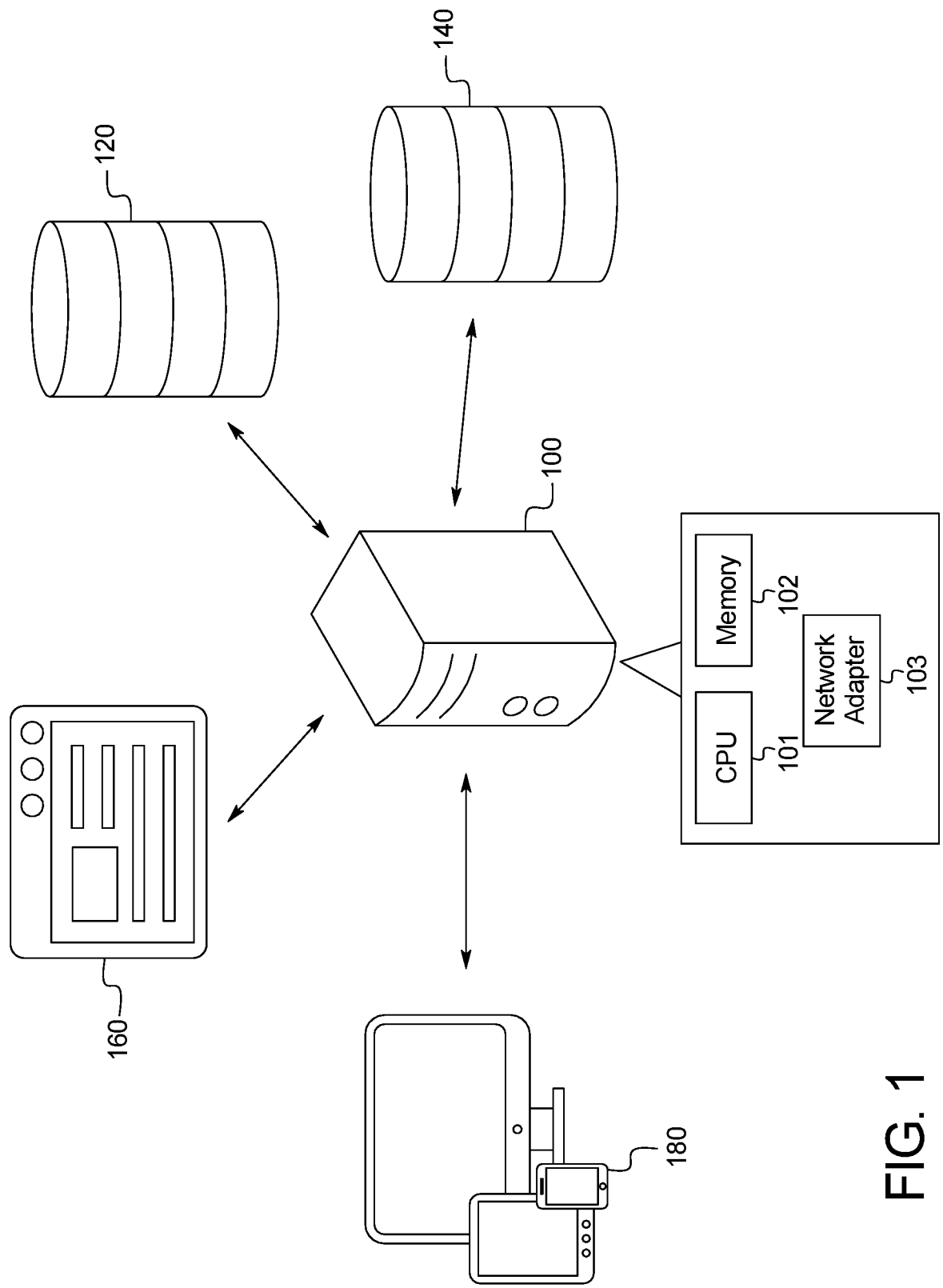
FIG. 1 is an schematic diagram of an artificially intelligent self-learning software operating system.

FIG. 1 is a schematic diagram of an artificially intelligent self-learning software operating system 10. In the example shown in FIG. 1, the system 10 includes a centralized server 100, internal database 120, external database 140, software programs 160, and end user device(s) 180. In this embodiment, the centralized server 100 hosts one or more artificial intelligence (AI) programs, algorithms, etc. These AI programs are run by the server's 100 central processing unit (CPU) 101 and stored upon its memory 102. The AI programs conduct various tasks to analyze and learn how to control various other software programs 160. To carry out these actions, the AI program(s) communicate with external data databases 140 and other sources to obtain screen shots and other data regarding operation of a given software program 160. Although shown as stored within the memory 102 of the server 100, it is contemplated that in other embodiments, the AI programs are hosted externally to the server 100.

Communication is carried out via the server's network adapter 103 over the internet, intranet, or any other means of digital data communication. Once training data is obtained from one or more external databases 140, this information is stored in the server's memory 102 and/or internal database(s) 120. The stored training data is then analyzed by the AI programs to generate one or more program controls application controls which enable a given piece of software 160 to be controlled automatically or semi-automatically by the AI programs.

Once a program control is generated, it is tested by the AI programs to ensure it functions above a predefined threshold before then being stored as a live program control in the system's 10 internal database(s) 140. It should be noted that the program controls may be tested in an isolated environment (e.g., non-production environment) to prevent AI mistakes from being seen by end users.

An example of the generation of a program control is provided with reference to the system 10 learning a new billing software system. Billing clients for work done and sending corresponding invoices is extremely time consuming and the software solutions which enable such billing and invoicing can be convoluted and tedious to use. To make use of these software programs more straightforward and less tedious, automated work arounds may be extremely useful. However, such automation cannot be done automatically with current technology and requires a computer programmer to write code which will, for example, automatically fill and email an invoice form to a client once a month. This code will also need to be updated if the underlying billing software is altered in a way which prevents the automated code from functioning.

The present system 10 can, via image recognition and other analytic tools, examine the graphical user interface, coding, etc. of another software program 160 to automatically generate program controls. Continuing with the example above, the present system 10 can take images from the training manual and/or training demonstration associated with the billing software and download these images to the sever 100 from an external database 140. Once downloaded, the images are examined by one or more pieces of code which are capable of machine learning (e.g., artificially intelligent program(s)) which analyze the format, placement of text and buttons, data entry fields, etc. to automatically generate executable code that can be used to automatically control the software.

If an end user wishes to automatically generate billing invoices once a month for all clients that had time billed to their account in the given month, the end user could specify this information via a graphical user interface used to set-up and control the artificially intelligent self-learning software operating system 10. Once this task is set up via the graphical user interface of the system 10 it may, in this example, then generate the corresponding program control. Alternatively, end users may be presented with a list of tasks which can be automated by the system 10 based off what it deduces as possible via its analysis of the billing software. Once the program control is in place, the system 10 will automatically control the underlying program and send out invoices as instructed.

Additionally, as the billing software is updated, changed, or replaced, the automated task(s) specified by an end user may continue to be carried out by the system 10. This is enabled its ability to identify control elements of a given piece of software. Practically, this could be useful if, for instance, the billing software changes its interface and alters the inputs needed to email out invoices. Using previous coding methods, the automated invoice email control program would also need to be updated. However, the present system 10 can identify the change, as well as determine the new steps required to send out the invoices monthly, as previously instructed. If it is still possible to conduct the instructed task, the system 10 continues to do so after adapting its program controls automatically. If the updates to the underlying controls prevent a task from being carried out, the system 10 notifies the end user (e.g., system administrator, etc.) of the issue. In this way, the system 10 not only provides value in reducing the need to manually re-program software but also prevents broken software automation(s) from going undetected.

Figure 2:
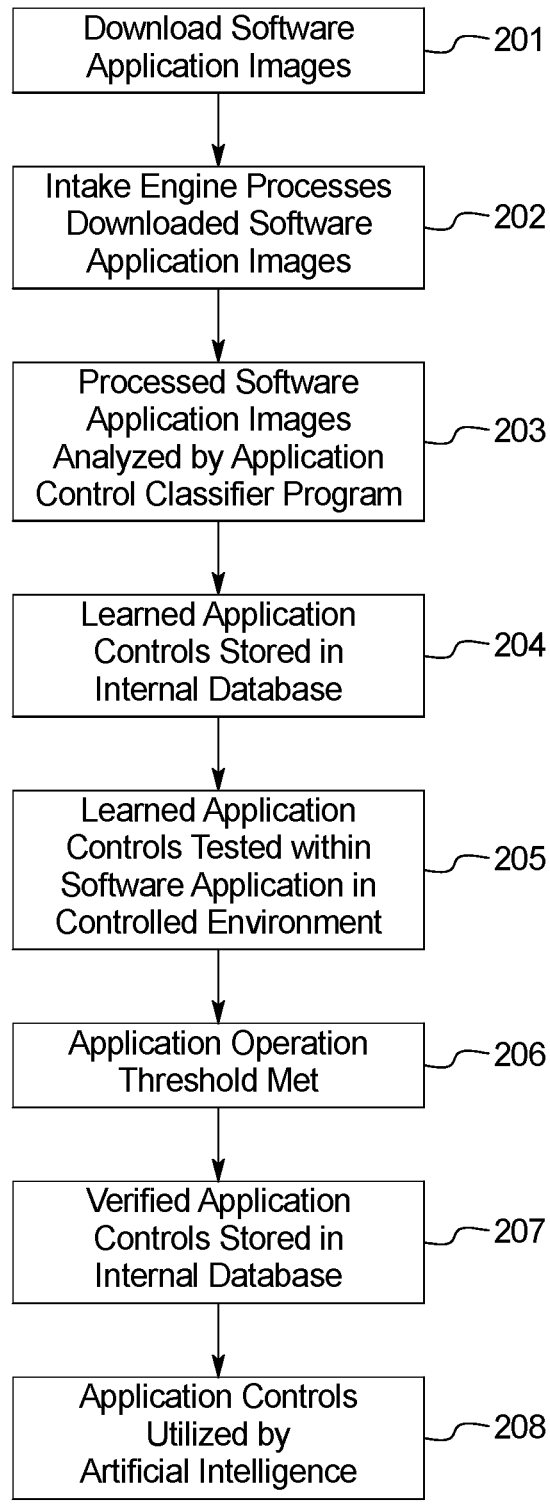
FIG. 2 is a flowchart which illustrates how an artificially intelligent self-learning software operating system creates a new program control.

FIG. 2 is a flowchart illustrating how an artificially intelligent self-learning software operating system 10 creates a new program control. As shown in FIG. 2, at a first step 201, the system 10 downloads images of a software application for which the system 10 is developing program controls. The images may be downloaded from any number of external databases 140 and additionally or alternatively obtained via manual upload by an end user. Once the images are obtained by the system 10, they are then processed by an intake engine (step 202). The intake engine selects software images to be downloaded (or searches through the downloaded images) based off various keywords to identify images of the software which match various potential program controls (see FIG. 3). After the intake engine identifies relevant software images, these images are then analyzed by an application control classifier program (step 203). The application control classifier program (see FIG. 3) in this example is a custom program coded in Python designed to classify the various program controls found in the software images. Once the system's 10 application control classifier program identifies the program controls found in a given image, these program controls are stored in one or more internal database 120 (see FIG. 1) at step 204.

Once a program control is stored in the system's internal databases 120, the system 10 will then automatically test the program control to ensure it functions properly (step 205). Testing of the program can be done upon a live version of the software which is to be controlled or, as shown here (see FIG. 4), can be tested in a non-production environment to prevent the system from sending erroneous messages to end users, etc. The determination of what constitutes proper functioning of a program control is defined, in this example, by an application operation threshold which must be met (see FIG. 4). The application operation threshold could be something like a 90 percent success rate for a given control. Once this success threshold is met (step 206), the system 10 can then be certain the program controls it has created based off various identified control elements in software images function properly. The verified program control(s) 420 (see FIG. 4) are then stored in the internal database(s) 120 once more (step 207), with the verified program controls 420 now available to be used in real world, live software controls utilized by the system's 10 AI programs (step 208).

The system 10 may create separate program controls for each underlying software program it is controlling or create a universal database of program controls which can be accessed for each software program (and modified as needed in real time). The present system 10 may also share program controls across all instances of the system 10, meaning if one instances of the system 10 deduces how to operate a certain program, this information may be dispersed to some or all other instances of the system 10 via the internet to improve efficiency.

Figure 3:
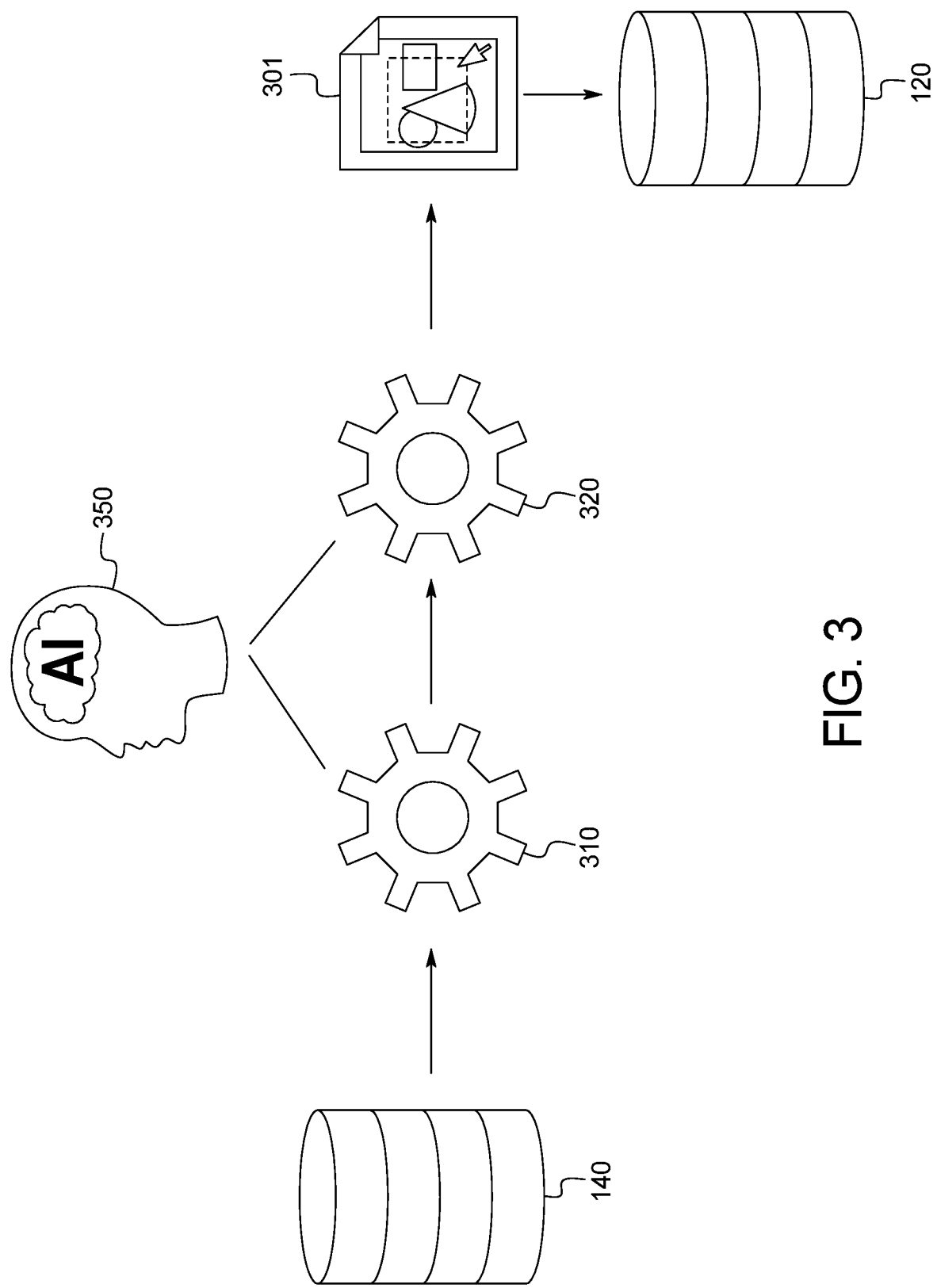
FIG. 3 is a schematic diagram illustrating how an artificially intelligent self-learning software operating system obtains software images.

FIG. 3 is a diagram which demonstrates how an artificially intelligent self-learning software operating system 10 obtains software images 301. As shown in FIG. 3, the system 10 downloads software images 301 from an external database 140. This external database 140 may be any number of online databases, image servers, etc. and the images 301 obtained may be those associated with end user training manuals which typically feature step-by-step guides (with images) that can be analyzed by the system 10. The system 10 downloads these images 301 via an intake engine program 310 which performs an initial analysis of the images 301 (pre or post-download onto the system 10). In this example, the intake engine program 310 is built with the C# programming language and Google Custom Search API.

The system 10 also employs an application control classifier program 320 which examines the images 301 identified by the intake engine program 310 to further identify program controls such as buttons or textboxes while ignoring irrelevant text, images, etc. within the images. The identified program controls are then stored in an internal database 120 accessible by the artificial intelligence (AI) program(s) 350 of the system 10.

The artificial intelligence (AI) program 350 of the system 10 is shown here as a separate entity for ease of description, but in reality, may be multiple separate programs or one single program which can conduct the tasks associated with the intake engine program 310, application control classifier program 320, and any other described system 10 functions, programs, algorithms, etc.

An example of the system 10 analyzing images 301 to identify program controls could be that of a new server management software suite. Server management software, especially for enterprise level servers, can be cumbersome and confusing to use. Typically, there are extensive training guides provided, but these training guides (e.g., help documents, how-to guides, etc.) can contain so much information that they are difficult to navigate, even for those skilled in the art. The present system 10 can review all the images 301 associated with such a training guide and identify the relevant program controls for performing various tasks within the server management software. These identified program controls are then tested by the system 10 to confirm they operate as expected (see FIG. 4).

Figure 4:
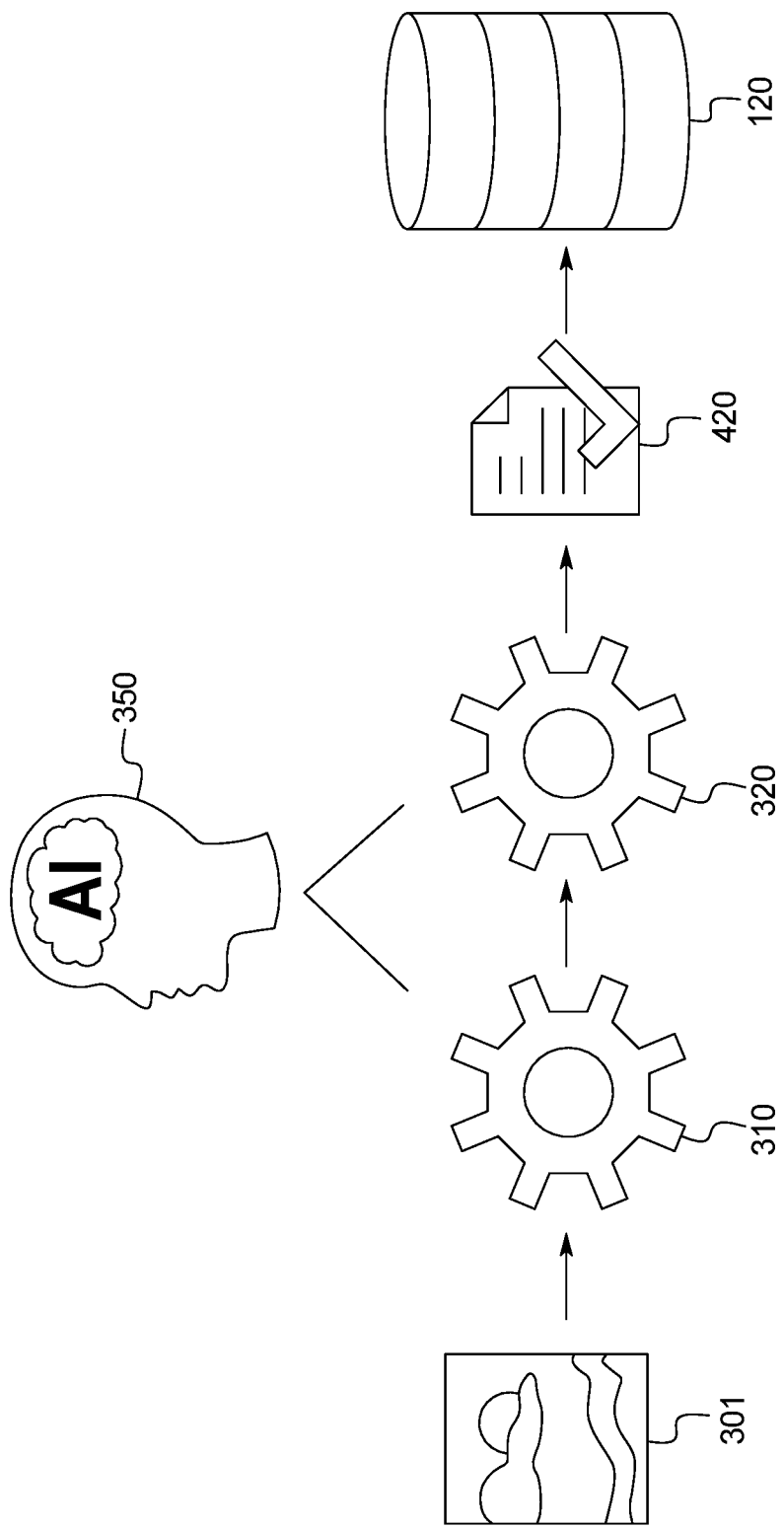
FIG. 4 is a schematic diagram illustrating how an artificially intelligent self-learning software operating system tests program controls.

FIG. 4 is a diagram which demonstrates how an artificially intelligent self-learning software operating system 10 tests program controls. As shown in FIG. 4, the AI program(s) 350 (of the system 10) test program controls the system 10 has identified and stored in its internal database(s) 120 (see FIG. 3). This testing is done by sending new sets of images 301 to system's intake engine program 310 and application control classifier program 320 to ensure the program controls identified are accurate and operate correctly based off the outputs generated from use of the controls (e.g., if a button identified as a submit button actually functions as one). Images 301 are sent and resent to the intake programs until a certain, pre-defined success threshold is met. Such a threshold could be the intake programs successfully identifying program controls with a 95 percent success rate. If this threshold is hit, the system 10 will then recognize the given program control as a verified program control 420 and store this control 420 in its internal database 120 for use by the AI program(s) 350 when interacting with end users (e.g., the program control will be put live).

It should be noted that the system 10 may utilize other programs, algorithms, etc. when creating program controls. For instance, a text extraction classifier program built using Python and Google Vision API may also be used to extract text from images and identify program controls as well as text labels associated with these controls such as "submit" or "enter first name". Similar to the intake engine program 310 and application control classifier program 320, the system 10 will also test the text extraction classifier program to confirm it is also capable of identifying various program controls at an acceptable threshold.

Figure 5:
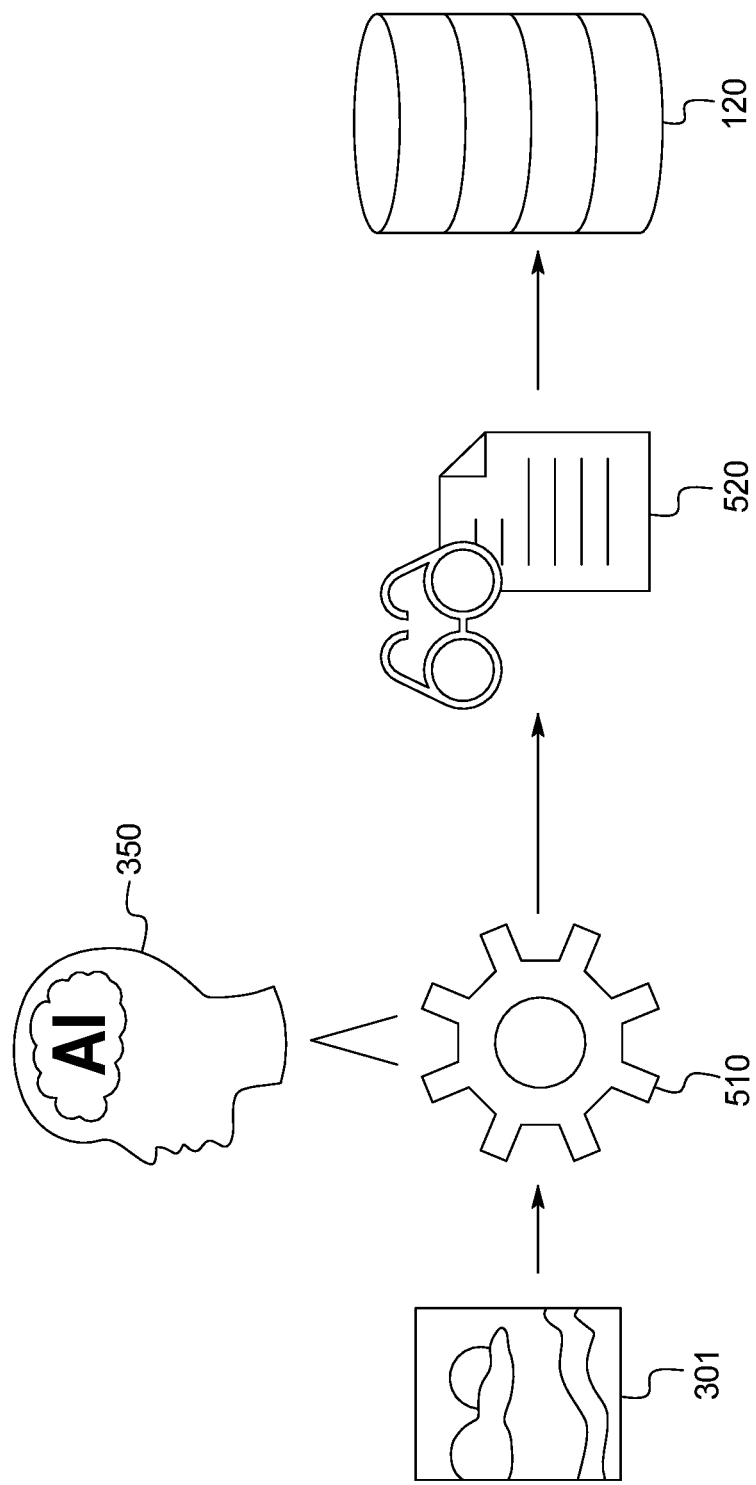
FIG. 5 is a schematic diagram illustrating how an artificially intelligent self-learning software operating system may search for program controls.

FIG. 5 is a diagram which demonstrates how an artificially intelligent self-learning software operating system 10 may search for program controls. As shown in FIG. 5, the present system 10 can also perform active searches in real-time to identify program controls. The identification of program controls mentioned in FIGS. 2-4 are passive in nature, with the system 10 automatically analyzing software images and identifying program controls. Alternatively, the system 10 can also be directed to search for specific program controls within a set of software images 301. This function of the system 10 may be directed by the system's AI 350 or done as a manual search based off end user input. Such a search may be carried out by the control finder program 510 which, in this example, is coded in the C# language and is part of the larger, AI program 350 which also features the intake engine program 310 and application control classifier program 320.

The control finder program 510 will accept various search parameters to identify the program control needed and any associated label. For example, searching for a program control "BUTTON" and text label "SEARCH" will enable the control finder program 510 to search images and locate labels containing the word "search". Text extraction may be utilized in this situation and then the control finder program 510 will identify the nearest program control button to the specified label, thus identifying the searched for program control (a search button).

Alternatively, if the program control is a text box or combo box, the control finder program 510 is programmed to check directly to the right or directly below where an indicated label is found. For example, if the label is "First Name" the system 10 will use text extraction to get coordinates of the "First Name" label, and then locate the program control nearest to the right or directly below the label.

Once a searched for program control is identified, the system 10 may again verify that the identified program control in indeed functioning as anticipated (see FIG. 4) and store this verified, searched program control 520 is then stored in the system's internal database 120 for later use.

It should be noted that the system 10 may feature a graphical user interface (GUI) which enables end users to review program controls generated by the system to ensure they match expectations. The GUI may display the program controls as easy to understand step-by-step lists or even the actual programming code of the program control(s) to enable issue to be spotted and corrected quickly and efficiently. The GUI mentioned above can also be used for system 10 set-up and maintenance. Who is allowed to update and utilize the system 10 can be managed as well as the system's 10 level of caution (e.g., how often it requires a human to review the program controls it generates, etc.).

Figure 6:
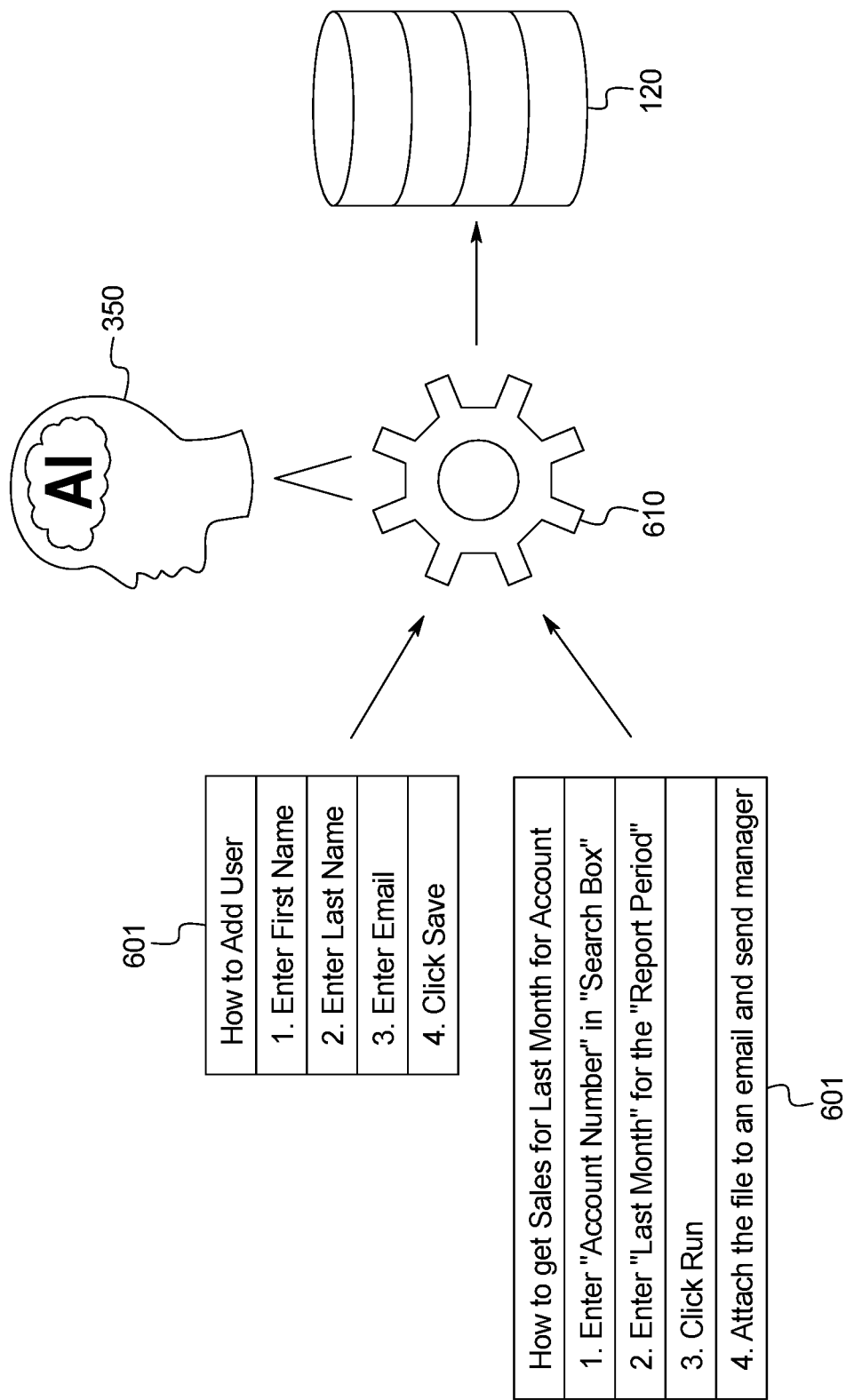
FIG. 6 is a schematic diagram illustrating how an artificially intelligent self-learning software operating system may accept instruction sets.

FIG. 6 is a diagram which demonstrates how an artificially intelligent self-learning software operating system 10 may accept instruction sets 601. As shown in FIG. 6, and end user may create their own instruction set(s) 601 which enable end users to enter information in the system's database 120 without the need to code such software operation instructions. The instructions set(s) may be received by an instruction set program 610. This program, which is part of the larger AI program 350 and may act to import and interpret plain language instruction sets. The instruction set program 610 may be coded in C# and/or Python.

The instruction set program 610 is used to understand an instruction set 601 written by a human and convert these instructions into a list of actions executable by the system 10. To do this, the instruction set program 610 utilizes natural language processing to segment the text and identify the software program control(s) it is referring to. The instruction set 601, in this example, must have a header and numbered steps to signal to the system 10 that a given list is an instruction set 601.

An instruction set 601 can also include screen shots of a program which can be processed by the instruction set program 610 into JavaScript Object Notation (JSON) with the screen shot images converted to binary code. The instruction set 601 could also be an existing user manual or one written specifically for the system 10 and can be in any number of formats including: PDF, Microsoft Word, text files, CSV files, etc.

An example of an instruction set 601 including screen shots could be an end user creating a program control for adding contacts to a contact list of a program. The end user could specify a sequential list of text steps: Enter First Name, Enter Last Name, Enter Email; then include a screen-shot of the program's contact list page and tell the system 10 to save the entered contact information to the location shown in the screen shot. The system 10 will then analyze the screen shot (see FIGS. 3-4) and deduce how to enter the specified information into the program's contact list.

Once an instruction set 601 is received and converted by the system 10 to an actionable program control, it will then be stored in the system's internal database 120 for use. The system 10 may also verify that the program control(s) it has generated based off the instruction set 601 function at an acceptable level before making it accessible to end users (see FIG. 4).

Figure 7:
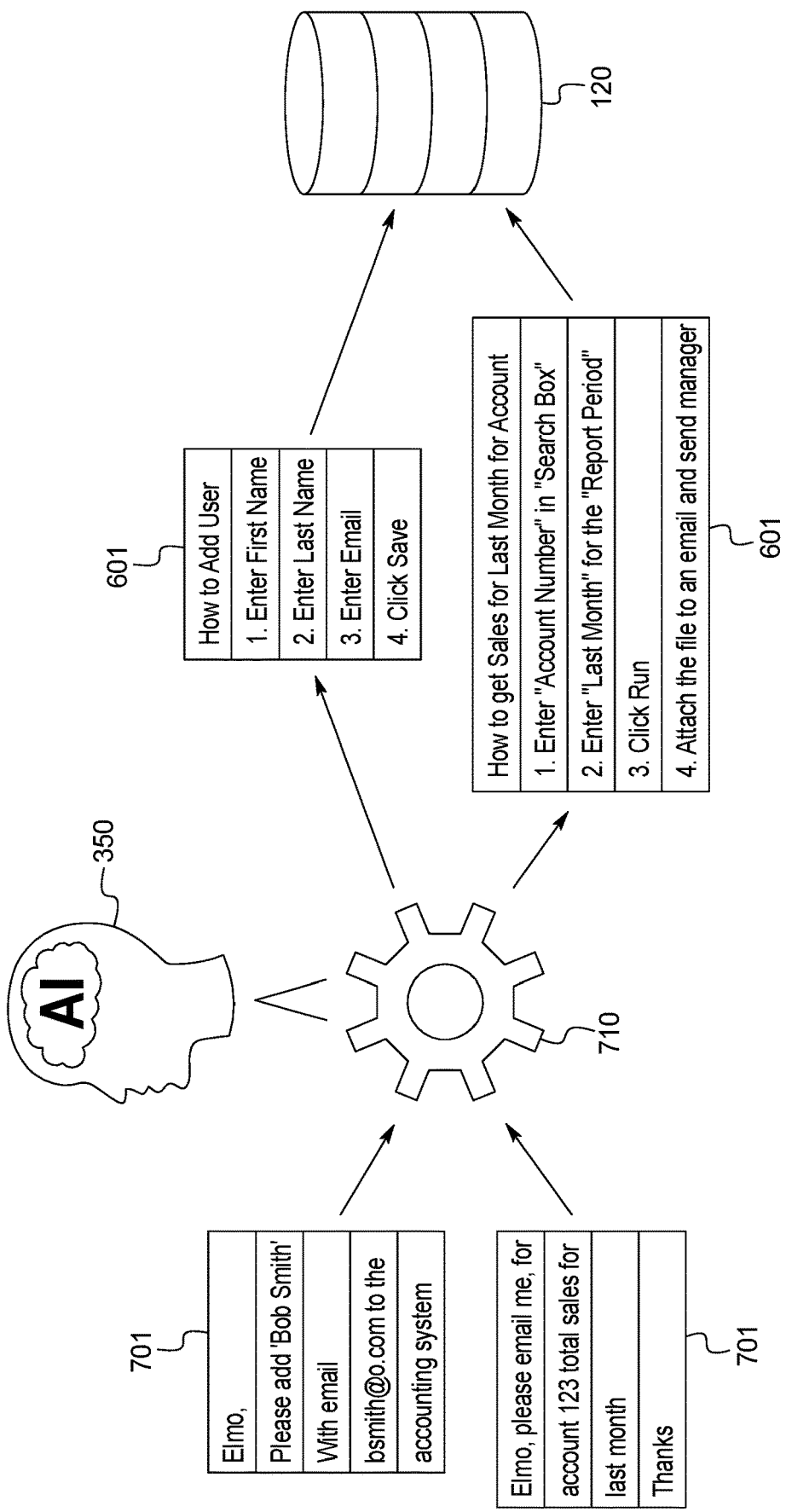
FIG. 7 is a schematic diagram illustrating how an artificially intelligent self-learning software operating system may accept plain language instruction sets.

FIG. 7 is a diagram which demonstrates how an artificially intelligent self-learning software operating system 10 may accept plain language instruction sets 701. Taking the ease-of-use of the present system 10 to higher levels, the present system 10 may also feature the ability to accept plain language commands in plain text or via voice command. To enable this functionality, the system's AI 350 may feature a natural language input program 710. This component may be built with C# and Python. It is used to understand a human command and locate matching program control(s) or create new ones. The natural language input program 710 may feature code which is capable of natural language processing to identify the program controls specified by an end user as needed as well as identify parameters and values to input. The natural language input program 710 converts the plain language instruction sets 701 into properly formatted instruction set(s) 601 which are then converted to program control(s) (see FIG. 6) for use by the system 10.

The plain language instruction sets 701, like the instruction set(s) 601 discussed in FIG. 6 may also feature screen shots of software. For example, using voice commands, an end user may instruct the system 10 to please add "Bob Smith" to a QuickBooks contact page. The system 10 can discern from these spoken commands that it should carry out the action of adding "Bob Smith" to the QuickBooks contact page. If the end user wishes to make things even clearer, they may take a screen shot of the QuickBooks contact page and tell the system 10 add "Bob Smith" to the page shown in the screen shot. The system 10 will then proceed to analyze both the spoken commands as well as the screen shot, determine the program control(s) to utilize (or create them), then finally carry out the action specified. Like all other methods of creating program controls mentioned throughout this disclosure, the plain language instruction sets 701 (converted to properly formatted instruction sets 601) may also be validated before being stored and/or accessible on the internal database 120 as program controls.

Figure 8:
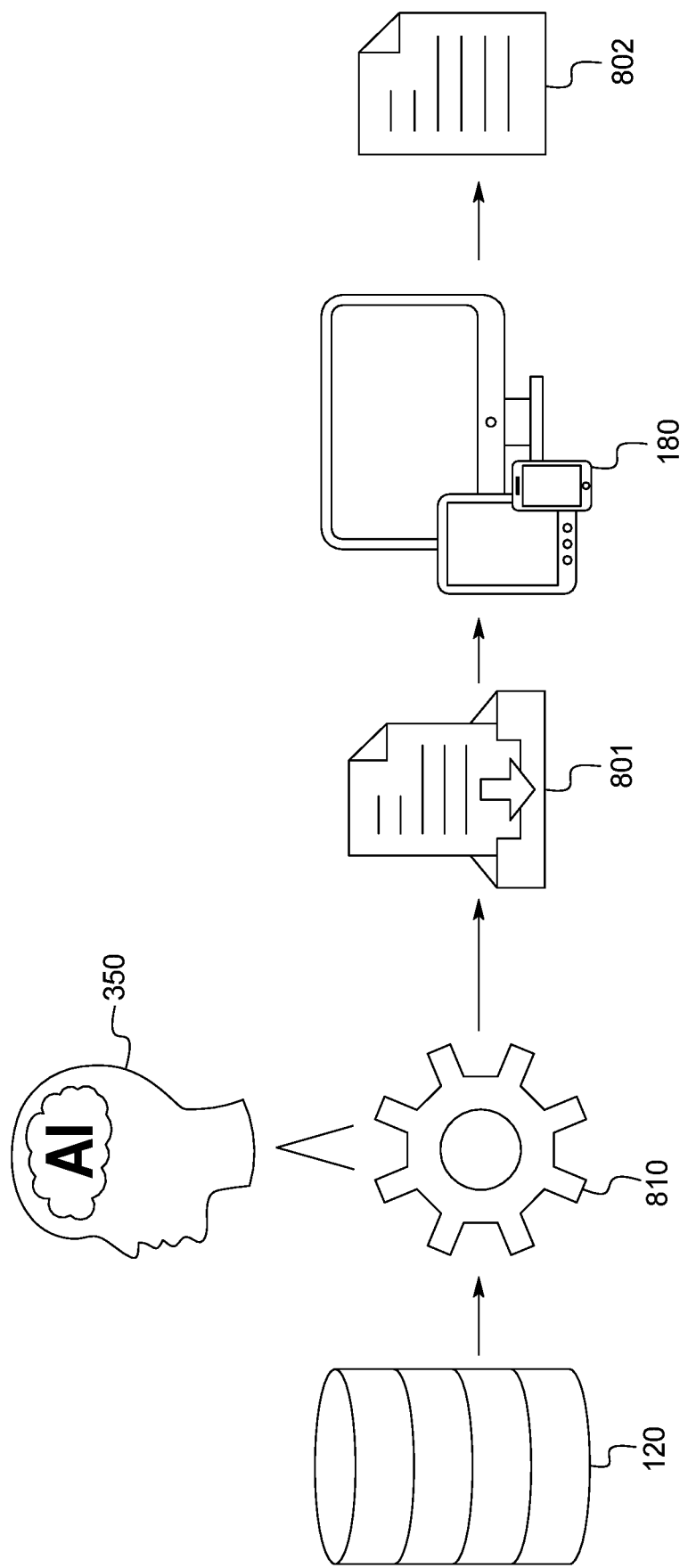
FIG. 8 is a schematic diagram illustrating how an artificially intelligent self-learning software operating system may utilize program controls.

FIG. 8 is a diagram which demonstrates how an artificially intelligent self-learning software operating system 10 may utilize program controls. As shown in FIG. 8, the system 10 may act upon various program controls it has stored in its internal databases 120 to carry out various actions within other software applications 160. The actions are carried out by an execution program 810 which acts upon the stored program instructions to carry out a specific task. The execution instruction 801 in this example is sent to an end user device 180 upon which a software application 160 being controlled by the system 10 is installed. The system 10 carries out the execution instruction 801 within the software upon the device 180 and then generates a confirmation 802 which can be in the form of email, SMS, etc. to confirm a task has been completed.

An example of the system 10 utilizing program controls could be an end user wishing to add their address book stored as an Excel file to QuickBooks. To do this, the end user, via formal 601 or informal 701 instruction set, commands the system 10 to add the contacts to QuickBooks. The system 10 will then reference its internal database(s) 120 to determine if it has the verified program controls 420 (see FIG. 4) stored to carry out such tasks. If not, it will proceed with creating these programs controls (see FIG. 3-4). Once the system 10 has the program controls needed, it will generate one or more execution instructions 801 to carry out the task stipulated. It will do so automatically and, in this case, add each contact from the Excel file to the instance of QuickBooks running on the end user device 180. After the task is complete, the system 10 will send a confirmation 802 which enables the end user to determine if the task was completed by the system 10 or not.

It should be noted that various changes and modifications to the presently preferred embodiments described herein will be apparent to those skilled in the art. Such changes and modifications may be made without departing from the spirit and scope of the present invention and without diminishing its attendant advantages.

What is claimed is:

1. A method of training a computer program to recognize software application controls comprising:
 providing a controller and a memory coupled to the controller, wherein the memory is configured to store program instructions executable by the controller, wherein in response to executing the program instructions, the controller is configured to:
  receive a first plurality of images of one or more GUIs of one or more software applications,
  analyze the first plurality of images of the one or more GUIs via an image recognition algorithm to identify a position and associate a function for each of one or more user input controls found in the images,
  generate a set of execution instructions associated with each of the one or more GUIs, each set of execution instructions including the identified position of the input controls and their associated functions in the associated GUI,
  test the accuracy of each set of execution instructions in each GUI by executing the associated function at the identified position for each input control in the execution instructions and analyzing one or more images captured to show the results of the execution by determining whether the execution of the associated function at the identified position for each input control in each set of execution instructions results in the intended function being executed in the GUI,
  wherein, when the tested accuracy exceeds a threshold accuracy for the location of controls and associated functions, the execution instruction is identified as live and when the tested accuracy does not exceed a threshold accuracy for the location of controls and associated functions, the controller is configured to receive a second plurality of images of one or more GUIs of one or more software applications to analyze, generate a set of execution instructions, and test the accuracy of each set of execution instructions until the tested accuracy exceeds a threshold accuracy for the location of controls and associated functions.

2. The method of claim 1, wherein the first plurality of images of the one or more GUIs are further analyzed by a text extraction program to identify a position and associate a function for each of one or more user input controls found in the images.

3. The method of claim 2, wherein the text extraction program utilizes optical character recognition.

4. The method of claim 1, wherein the identified position of an input control is a centroid position of the input control.

5. The method of claim 1, wherein one of the execution instructions clicks a button, inputs text, selects checkboxes, or selects drop down options within an application.

6. The method of claim 1, wherein an end user performs a keyword search which causes the program instructions to generate an execution instruction; the execution instruction corresponding, at least in part, to one or more terms of the keyword search.

7. The method of claim 1, wherein the program instructions further include instructions that, when executed, dictate the amount of manual review required before the execution instructions are executed.

8. A computer system to recognize software application controls comprising:
 a controller; and
 a memory coupled to the controller, wherein the memory is configured to store program instructions executable by the controller;
 wherein in response to executing the program instructions, the controller is configured to:
  receive a first plurality of images of one or more GUIs of one or more software applications,
  analyze the first plurality of images of the one or more GUIs via an image recognition algorithm to identify a position and associate a function for each of one or more user input controls found in the images,
  generate a set of execution instructions associated with each of the one or more GUIs, each set of execution instructions including the identified position of the input controls and their associated functions in the associated GUI,
  test the accuracy of each set of execution instructions in each GUI by executing the associated function at the identified position for each input control in the execution instructions and analyzing one or more images captured to show the results of the execution by determining whether the execution of the associated function at the identified position for each input control in each set of execution instructions results in the intended function being executed in the GUI, wherein, when the tested accuracy exceeds a threshold accuracy for the location of controls and associated functions, the execution instruction is identified as live and when the tested accuracy does not exceed a threshold accuracy for the location of controls and associated functions, the controller is configured to receive a second plurality of images of one or more GUIs of one or more software applications to analyze, generate a set of execution instructions, and test the accuracy of each set of execution instructions until the tested accuracy exceeds a threshold accuracy for the location of controls and associated functions.

9. The system of claim 8, wherein the first plurality of images of the one or more GUIs are further analyzed by a text extraction program to identify a position and associate a function for each of one or more user input controls found in the images.

10. The system of claim 9, wherein the text extraction program utilizes optical character recognition.

11. The system of claim 8, wherein the identified position of an input control is a centroid position of the input control.

12. The system of claim 8, wherein one of the execution instructions clicks a button, inputs text, selects checkboxes, or selects drop down options within an application.

13. The system of claim 8, wherein an end user performs a keyword search which causes the program instructions to generate an execution instruction; the execution instruction corresponding, at least in part, to one or more terms of the keyword search.

14. The system of claim 8, wherein the program instructions further include instructions that, when executed, dictate the amount of manual review required before the execution instructions are executed.

15. A method of training a computer program to recognize software application controls comprising:
providing a controller and a memory coupled to the controller, wherein the memory is configured to store program instructions executable by the controller, wherein in response to executing the program instructions, the controller is configured to:
receive a first plurality of images of one or more GUIs of one or more software applications;
analyze the first plurality of images of the one or more GUIs via an image recognition algorithm to identify a position and associate a function for each of one or more user input controls found in the images,
generate a set of execution instructions associated with each of the one or more GUIs, each set of execution instructions including the identified position of the input controls and their associated functions in the associated GUI;
test the accuracy of each set of execution instructions in each GUI by executing the associated function at the identified position for each input control in the execution instructions and analyzing one or more images captured to show the results of the execution by determining whether the execution of the associated function at the identified position for each input control in each set of execution instructions results in the intended function being executed in the GUI,
wherein, when the tested accuracy exceeds a threshold accuracy for the location of controls and associated functions, the execution instruction is identified as live and when the tested accuracy does not exceed a threshold accuracy for the location of controls and associated functions, the controller is configured to receive a second plurality of images of one or more GUIs of one or more software applications to analyze, generate a set of execution instructions, and test the accuracy of each set of execution instructions until the tested accuracy exceeds a threshold accuracy for the location of controls and associated functions; and
execute the live execution instructions in response to receiving one or more voice commands or one or more text commands from a user.

16. The method of claim 15, wherein the first plurality of images of the one or more GUIs are further analyzed by a text extraction program to identify a position and associate a function for each of one or more user input controls found in the images.

17. The method of claim 15, wherein the identified position of an input control is a centroid position of the input control.

18. The method of claim 15, wherein, when executed, one of the execution instructions clicks a button, inputs text, selects checkboxes, or selects drop down options within an application.

19. The method of claim 15, wherein the one or more voice commands or one or more text commands from a user are received as part of an end user keyword search.

20. The method of claim 15, wherein the program instructions further include instructions that, when executed, dictate the amount of manual review required before the execution instructions are executed.

* * * * *